US008787315B2

(12) United States Patent
Huang et al.

(10) Patent No.: US 8,787,315 B2
(45) Date of Patent: Jul. 22, 2014

(54) METHOD AND DEVICE FOR HANDING OFF BETWEEN BASE STATIONS

(75) Inventors: Boqiu Huang, Guangdong Province (CN); Yu Liu, Guangdong Province (CN); Yankun Zou, Guangdong Province (CN); Qiang Wan, Guangdong Province (CN); Wei Wang, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 279 days.

(21) Appl. No.: 13/257,869

(22) PCT Filed: Sep. 24, 2009

(86) PCT No.: PCT/CN2009/074193
§ 371 (c)(1),
(2), (4) Date: Nov. 25, 2011

(87) PCT Pub. No.: WO2010/142099
PCT Pub. Date: Dec. 16, 2010

(65) Prior Publication Data
US 2012/0069818 A1    Mar. 22, 2012

(30) Foreign Application Priority Data

Jun. 12, 2009    (CN) .......................... 2009 1 0086971

(51) Int. Cl.
*H04W 36/00*    (2009.01)
(52) U.S. Cl.
USPC ........................................................ 370/331
(58) Field of Classification Search
USPC ........................................................ 370/331
See application file for complete search history.

(56) References Cited

U.S. PATENT DOCUMENTS

| 6,049,564 | A  | * | 4/2000 | Chang ............................ | 375/130 |
| 6,272,122 | B1 | * | 8/2001 | Wee ............................... | 370/342 |
| 6,553,230 | B1 | * | 4/2003 | Plestid et al. ................. | 455/436 |

FOREIGN PATENT DOCUMENTS

CN    1556601 A    12/2004

OTHER PUBLICATIONS

Huang, Xiaochen et al., Research on Reasons of Drop Call in CDMA Network, Oct. 2008.
International Search Report for PCT/CN2009/074193 dated Jan. 29, 2010.

* cited by examiner

*Primary Examiner* — Sulaiman Nooristany
(74) *Attorney, Agent, or Firm* — Ling Wu; Stephen Yang; Ling & Yang Intellectual Property LLC

(57) ABSTRACT

The present invention discloses a method and apparatus for handoff between base stations. A target base station bears its PILOT_INC information into a handoff request acknowledge message to inform a source base station when sending a handoff request acknowledge message to the source base station after receiving a handoff request from the source base station, thus, even if a UE requesting handoff reports PILOT_PN_PHASE under the target BS in a residual set, the source BS can determine PILOT_PN corresponding to the PILOT_PN_PHASE through the PILOT_INC information of the target base station, thereby completing cell handoff between the base stations successfully. The present invention is a supplement to the existing handoff between the base stations with configurations of the PILOT_INC information being different, and augments the success rate of handoff between the base stations of the UE, thereby improving the traffic service quality of a CDMA system.

6 Claims, 1 Drawing Sheet

METHOD AND DEVICE FOR HANDING OFF BETWEEN BASE STATIONS

TECHNICAL FIELD

The present invention relates to cell handoff technology, and more particularly, to a method and device for handoff between base stations (BS) with configurations of pilot offset increments (PILOT_INC) being different in a code division multiple access (CDMA) system.

BACKGROUND OF THE RELATED ART

In a CDMA system, pseudo noise (PN) is offset to be a phase of a short code pseudo random series of 15 bits with the unit being 64 chips. There is a pilot offset increment (PILOT_INC) parameter in the system, where pilot PN (PILOT_PN) of each BS is an integral multiple of this parameter. For example, when PILOT_INC is a default value of 4 for the CDMA protocol, the number of pilot offsets that can be used for assignment is 512/4=128, wherein the pilot offset is referred to as an offset value relative to a zero offset pilot series with the maximum value being 512, and PILOT_PN may be 0, 4, 8, 12, 16 . . . A user equipment (UE) submits a pilot intensity measurement report containing information, such as pilot PN phase (PILOT_PN_PHASE) and its corresponding intensity, to a BS, wherein PILOT_PN_PHASE is a pilot phase with the unit being a chip, measured by a UE under system time. Because of some reasons, such as the existence of signal propagation delay, PILOT_PN_PHASE is not necessary to exactly equal to an integral multiple of PILOT_INC×64, but PILOT_PN should be an integral multiple of the ratio of PILOT_PN_PHASE to PILOT_INC×64, that is, PILOT_PN may be obtained through the following equation:

$$PILOT\_PN = \left\lfloor \frac{PILOT\_PN\_PHASE + 32 \times PILOT\_INC}{64 \times PILOT\_INC} \right\rfloor \times PILOT\_INC,$$

Where "⌊ ⌋" means rounding down calculation. The reason why PILOT_PN_PHASE and 32×PILOT_INC are summed up and then the sum is divided by 64×PILOT_INC is that in view of the possible delay in PILOT_PN_PHASE reported by the UE, a complete PILOT_PN_PHASE will be formed after 32×PILOT_INC is added.

According to the status maintained by the UE, PILOT_PN may be divided into several sets, namely, an activation set, candidate set, neighbor set and residual set. The activation set refers to a set of PILOT_PNs which have been assigned to the UE and are being demodulated; the candidate set refers to a set of PILOT_PNs which have not yet entered into the activation set to be demodulated but reach intensity required for correct demodulation; the neighbor set refers to a set of PILOT_PNs which have not yet entered into the activation set or candidate set but may enter into the activation set or candidate set upon handoff; and the residual set refers to a set of all the other PILOT_PNs except the activation set, candidate set and neighbor set in the system. The UE searches only the PILOT_PNs which equal to an integral multiple of PILOT_INC when searching the residual set. The larger the value of PILOT_INC, the larger the interval between the PILOT_PNs of each base station is distinguished, thus, misjudgment of PILOT_PN is not caused easily, but in the meantime the number of PILOT_PNs which can be assigned by the system is less.

PILOT_PN resources available for assignment will be less and less with increasing of the number of base stations. A current solution is to use different PILOT_INCs within or between the BSs, that is, in regions where the BSs are distributed more densely, PILOT_INC may be assigned a minor value, such as 2, to obtain more PILOT_PNs available for assignment; whereas in regions where there are less BSs, PILOT_INC may be assigned a larger value, such as a protocol default value 4.

However, in an across-BS handoff process of the existing standard, when a target BS and a source BS are assigned different PILOT_INC information, and when the pilot intensity measurement report submitted by the UE contains PILOT_PN_PHASE under the target BS in the residual set, because the source BS can not obtain the PILOT_INC information of the target BS, the source BS will not be able to calculate PILOT_PN accurately, which will cause failure of handoff, and current traffic of the UE will be interrupted.

SUMMARY OF THE INVENTION

In view of the above, the main object of the present invention is to provide a method and device for handoff between base stations with configurations of pilot offset increments being different such that even if a UE to be handed off, located at a cell edge between the base stations, reports PILOT_PN_PHASE under a target BS, a source BS can determine PILOT_PN corresponding to the PILOT_PN_PHASE, thereby completing cell handoff between the base stations successfully.

In order to achieve the above object, the technical scheme of the present invention is implemented as follows.

The present invention provides a method for handoff between base stations comprising:

a target base station informing a source base station of pilot offset increment (PILOT_INC) information of the target station after receiving a handoff request message sent by the source base station.

Preferably, before the step of the target base station informing the source base station of the PILOT_INC information through the handoff request acknowledge message, the method further comprises:

the target base station configuring a dedicated information unit bearing the PILOT_INC information in the handoff request acknowledge message, and bearing the PILOT_INC information into the dedicated information unit.

Preferably, before the step of the target base station informing the source base station of the PILOT_INC information through the handoff request acknowledge message, the method further comprises:

the target base station bearing the PILOT_INC information into an existing information unit in the handoff request acknowledge message.

Preferably, the existing information unit in the handoff request acknowledge message comprises a neighbor information unit in a neighbor list or extended neighbor list.

Preferably, after the step of the target base station informing the source base station of the PILOT_INC information through the handoff request acknowledge message, the method further comprises:

the source base station receiving the PILOT_INC information of the target base station, and calculating pilot pseudo noise for a pilot pseudo noise phase reported by a user equipment requesting handoff using the PILOT_INC information.

Preferably, an equation for calculating the pilot pseudo noise comprises is:

$$PILOT\_PN = \left\lfloor \frac{PILOT\_PN\_PHASE + 32 \times PILOT\_INC}{64 \times PILOT\_INC} \right\rfloor \times PILOT\_INC,$$

where PILOT_PN means the pilot pseudo noise, PILOT_PN_PHASE means the pilot pseudo noise phase, and "⌊ ⌋" means rounding down calculation.

The present invention provides an apparatus for handoff between base stations comprising:

a first receiving unit configured to receive a handoff request message sent by a source base station; and an informing unit configured to inform the source base station of PILOT_INC information of a target base station.

Preferably, the apparatus further comprises:

a configuration unit configured to configure a dedicated information unit bearing the PILOT_INC information in the handoff request acknowledge message; and a first bearing unit configured to bear the PILOT_INC information into the dedicated information unit.

Preferably, the apparatus further comprises:

a second bearing unit configured to bear the PILOT_INC information into an existing information unit in the handoff request acknowledge message.

Preferably, the information existing request acknowledge message comprises a neighbor information unit in a neighbor list or extended neighbor list.

Preferably, the apparatus further comprises:

a second receiving unit configured to receive the PILOT_INC information of the target base station and a pilot pseudo noise phase reported by a user equipment requesting handoff; and a calculating unit configured to calculate the pilot pseudo noise for the pilot pseudo noise phase using the PILOT_INC information of the target base station.

Preferably, the manner for the calculating unit to calculate the pilot pseudo noise comprises using the following formula:

$$PILOT\_PN = \left\lfloor \frac{PILOT\_PN\_PHASE + 32 \times PILOT\_INC}{64 \times PILOT\_INC} \right\rfloor \times PILOT\_INC,$$

where PILOT_PN means the pilot pseudo noise, PILOT_PN_PHASE means the pilot pseudo noise phase, and "⌊ ⌋" means rounding down calculation.

In the present invention, the target base station bears its PILOT_INC information into the handoff request acknowledge message to inform the source base station when sending the handoff request acknowledge message to the source base station after receiving the handoff request from the source base station, thus, even if a UE requesting handoff reports PILOT_PN_PHASE under the target BS in a residual set, the source BS can determine PILOT_PN corresponding to the PILOT_PN_PHASE through the PILOT_INC information of the target base station, thereby completing cell handoff between the base stations successfully. The present invention is a supplement to the existing handoff between the base stations with configurations of the PILOT_INC information being different, and augments the success rate of handoff between the base stations of the UE, thereby improving the traffic service quality of a CDMA system.

PREFERRED EMBODIMENTS OF THE PRESENT INVENTION

The basic idea of the present invention is that a target base station bears its PILOT_INC information into a handoff request acknowledge message to inform a source base station when sending a handoff request acknowledge message to the source base station after receiving a handoff request from the source base station, thus, even if a UE requesting handoff reports PILOT_PN_PHASE under the target BS in a residual set, the source BS can determine PILOT_PN corresponding to the PILOT_PN_PHASE through the PILOT_INC information of the target base station, thereby completing cell handoff between the base stations successfully. The present invention is a supplement to the existing handoff between the base stations with configurations of the PILOT_INC information being different, and augments the success rate of handoff between the base stations of the UE, thereby improving the traffic service quality of a CDMA system.

In order to make the object, technical scheme and advantages of the present invention more clear, the present invention will be described in detail in conjunction with embodiments and with reference to the accompanying drawings.

Figure 1:
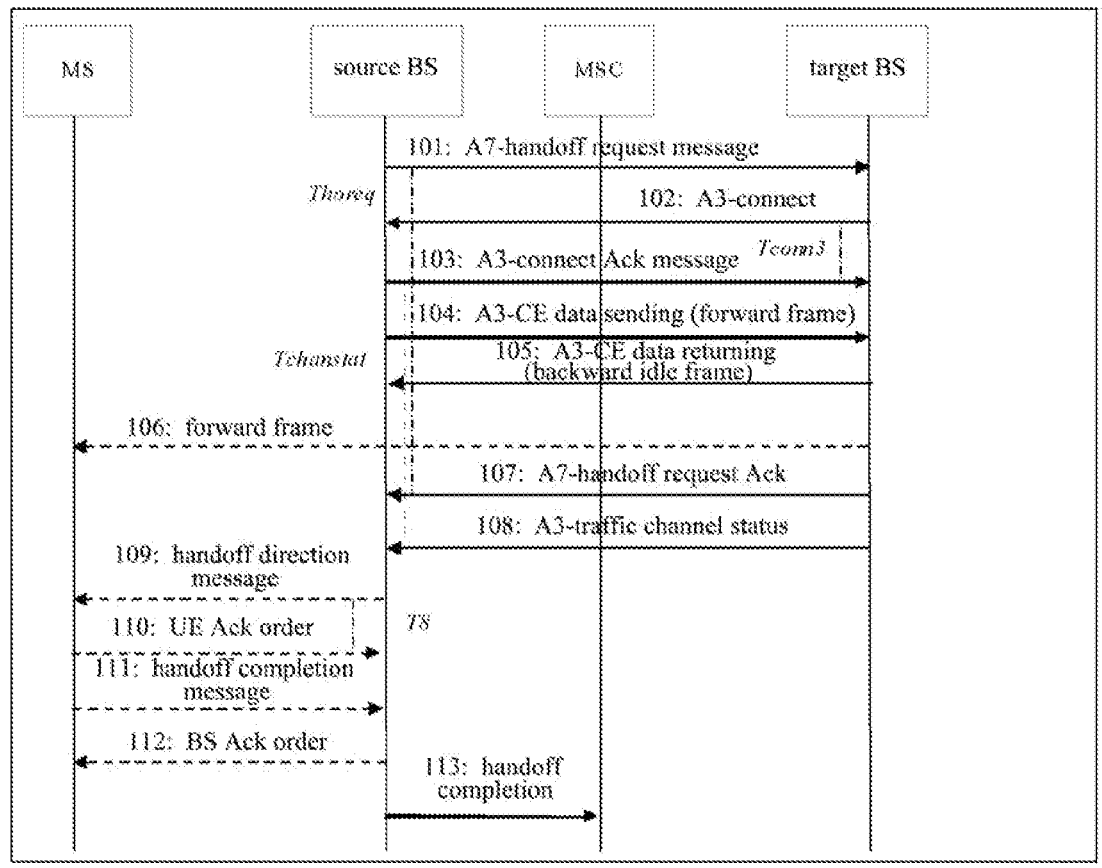
FIG. 1 is a flow chart of a method for handoff between base stations with configurations of PILOT_INCs being different in accordance with the present invention.

FIG. 1 is a flow chart of a method for handoff between base stations with configurations of PILOT_INCs being different in accordance with the present invention. As shown in FIG. 1, the method for handoff between the base stations with configurations of PILOT_INCs being different in accordance with the present invention comprises the following steps.

Step 101: a source BS determines whether one or more sectors are required to be added to a target BS to support soft/softer handoff. The source BS sends an A7-handoff request message to the target BS and starts a timer Thoreq.

Step 102: the target BS establishes an A3 traffic connection (or joins in an existing A3-connect) by sending an A3-connect message to the source BS, and starts a timer Tconn3. An A7-handoff request message may lead to the establishment of a plurality of A3 traffic connections, each traffic connection being required to send an A3-connect message. FIG. 1 only exemplarily depicts an example of the establishment of one A3 traffic connection.

Step 103: the source BS sends an A3-connect acknowledge (A3-Connect Ack) message to complete the A3 connection, or confirms that the sectors of the target BS joins in an existing A3 connection. The target BS stops the timer Tconn3 after receiving the A3-Connect Ack message. At this time, the source BS starts a timer Tchanstat if the source BS requests to obtain a notice that commences being transmitted at the target BS.

Step 104: the source BS commences sending a forward frame to the target BS through an A3-CE data forward message.

Step 105: the target BS commences sending a backward idle frame after receiving the first forward frame sent by the source BS. The backward frame includes time adjusting information which is helpful for synchronization.

Step 106: when the synchronization occurs, the target BS commences sending the forward frame at an air interface.

Step 107: the target BS sends an A7-handoff request acknowledge message to the source BS to indicate that the sectors are added successfully. The source BS stops the timer Thoreq. The PILOT_INC information of each sector under the target BS is contained in a neighbor list or extended neighbor list in the A7-Handoff Request Ack message, specifically in Neighbor Info in the neighbor list or extended neighbor list. Or the format of the A7-Handoff Request Ack message is modified and a new information unit is added to bear the PILOT_INC information of the target BS specially. Generally, the PILOT_INC information under one BS is same, and when the BS supports multiple carrier frequencies, a physical sector area will include sectors with multiple carrier frequencies and the PILOT_INC information which is configured for each carrier frequency sector by the BS will be different. Upon handoff between the base stations, the UE may report the PILOT_PN_PHASE under the target BS by informing the source BS of the PILOT_INC information of each sector under the target BS when submitting a pilot intensity measurement report and reporting the PILOT_PN_PHASE. At this time, because the source BS has received all possible PILOT_INC information under the target BS reported by the UE, the PILOT_PN under the target BS can be calculated using the PILOT_INC under the target BS, thereby ensuring the success of handoff of the UE.

A manner for calculating PILOT_PN is as follows:

$$PILOT\_PN = \left\lfloor \frac{PILOT\_PN\_PHASE + 32 \times PILOT\_INC}{64 \times PILOT\_INC} \right\rfloor \times PILOT\_INC,$$

where "$\lfloor \; \rfloor$" means rounding down calculation.

Step 108: if the source BS chooses to receive a commencing notice sent and received by the target BS, then when its service data unit (SDU) function and the target BS accomplish synchronization for an A3 traffic sub-channel, the target BS responds to A3-traffic channel status information for the source BS. This step can be performed at any time following the step 104. If the timer Tchanstat is started, the source BS will stop the timer.

Step 109: the source BS sends a handoff direction message to the UE to add PILOT_PNs in the new sectors under the target BS to the activation set.

Step 110: The UE sends a user equipment acknowledge order (UE Ack Order) after receiving the handoff direction message.

Step 111: the UE sends a handoff completion message to indicate the result of successful processing of the handoff direction message.

Step 112: the source BS sends a base station acknowledge order (BS Ack Order) after receiving the handoff completion message.

Step 113: the source BS may send a handoff performed message to a mobile switching center (MSC). The handoff performed message may be sent at any time after the source BS receives the handoff completion message.

Figure 2:
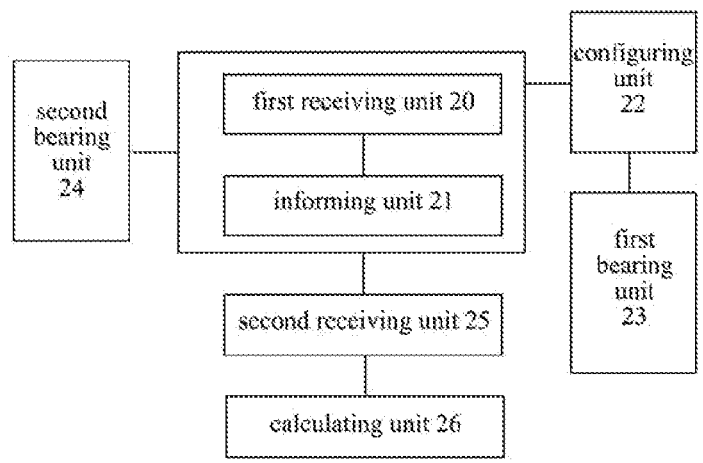
FIG. 2 is a block diagram of an apparatus for handoff between base stations with configurations of PILOT_INCs being different in accordance with the present invention.

FIG. 2 is a block diagram of an apparatus for handoff between base stations with configurations of PILOT_INCs being different in accordance with the present invention. As shown in FIG. 2, the apparatus for handoff between the base stations with configurations of PILOT_INCs being different in accordance with the present invention includes a first receiving unit 20 configured to receive a handoff request message sent by a source base station and an informing unit 21 configured to inform the source base station of PILOT_INC information of a target base station through a handoff request acknowledge message.

As shown in FIG. 2, the apparatus for handoff between the base stations with configurations of PILOT_INCs being different in accordance with the present invention further includes a configuration unit 22 configured to configure a dedicated information unit which bears the PILOT_INC information in the handoff request acknowledge message and a first bearing unit 23 configured to bear the PILOT_INC information into the dedicated information unit.

As shown in FIG. 2, the apparatus for handoff between the base stations with configurations of PILOT_INCs being different in accordance with the present invention further includes a second bearing unit 24 configured to bear the PILOT_INC information into an existing information unit in the handoff request acknowledge message, wherein the information existing request acknowledge message comprises a neighbor information unit in a neighbor list or extended neighbor list.

As shown in FIG. 2, the apparatus for handoff between the base stations with configurations of PILOT_INCs being different in accordance with the present invention further includes a second receiving unit 25 configured to receive the PILOT_INC information of the target base station and a pilot pseudo noise phase reported by a user equipment requesting handoff and a calculating unit 26 configured to calculate the pilot pseudo noise for the pilot pseudo noise phase using the PILOT_INC information of the target base station. A formula for calculating PILOT_PN is:

$$PILOT\_PN = \left\lfloor \frac{PILOT\_PN\_PHASE + 32 \times PILOT\_INC}{64 \times PILOT\_INC} \right\rfloor \times PILOT\_INC,$$

where "$\lfloor \; \rfloor$" means rounding down calculation.

It should be understood by those skilled in the art that the configuring unit 22, the first bearing unit 23, the second bearing unit 24, the second receiving unit 25 and the calculating unit 26 are not necessary technical features which are required to implement the apparatus for handoff between the base stations with configurations of PILOT_INCs being different in accordance with the present invention, and that these technical features may be combined with the aforementioned first receiving unit 20 and informing unit 21 to constitute a preferred embodiment, and the combination of the above technical features and the aforementioned first receiving unit 20 and informing unit 21 may also constitute a preferred embodiment.

It should be understood by those skilled in the art that practical functions of each processing unit of the apparatus for handoff between the base stations with configurations of pilot offset increments being different in accordance with the present invention shown in FIG. 2 can be understood with reference to the related description of each step in FIG. 1 described above, and the functions of each unit can be implemented through a program running on a processor and can also be implemented through a corresponding logic circuit.

The above description is merely the preferred embodiments of the present invention and is not intended to limit the protection scope of the present invention.

Industrial Applicability

In the present invention, a target base station bears its PILOT_INC information into a handoff request acknowledge message to inform a source base station when sending a handoff request acknowledge message to the source base station after receiving a handoff request from the source base station, thus, even if a UE requesting handoff reports PILOT_PN_PHASE under the target BS in a residual set, the source BS can determine PILOT_PN corresponding to the PILOT_PN_PHASE through the PILOT_INC information of the target base station, thereby completing cell handoff between the base stations successfully. The present invention is a supplement to the existing handoff between the base stations with configurations of the PILOT_INC information being different, and augments the success rate of handoff between the base stations of the UE, thereby improving the traffic service quality of a CDMA system.

What we claim is:

1. A method for handoff between Code Division Multiple Access (CDMA) base stations comprising:
   a target base station configuring a dedicated information unit bearing the PILOT_INC information in the handoff request ACK message, and bearing the PILOT_INC information into the dedicated information unit;
   the target base station informing a source base station of Pilot pseudo noise sequence offset index increment (PILOT_INC) information of the target base station through a handoff request ACK message after receiving a handoff request message sent by the source base station, wherein the PILOT_INC of the source base station and the PILOT_INC of the target base station is different;
   the source base station receiving the PILOT_INC information of the target base station, and according to the PILOT_INC information from the target base station to calculate pilot pseudo noise (PILOT_PN) corresponding to the pilot pseudo noise phase (PILOT_PN_PHASE) of the target base station reported by a user equipment that requests handoff between the base stations, thereby making the handoff between the base stations successful;
   wherein an equation for calculating the pilot pseudo noise is:

$$PILOT\_PN = \left\lfloor \frac{PILOT\_PN\_PHASE + 32 \times PILOT\_INC}{64 \times PILOT\_INC} \right\rfloor \times PILOT\_INC,$$

where PILOT_PN means the pilot pseudo noise, PILOT_PN_PHASE means the pilot pseudo noise phase, and "$\lfloor \ \rfloor$" means rounding down calculation.

2. The method according to claim 1, before the step of the target base station informing the source base station of the PILOT_INC information through the handoff request ack message, the method further comprising:
   the target base station bearing the PILOT_INC information into an existing information unit in the handoff request ack message.

3. The method according to claim 2, wherein the existing information unit in the handoff request ack message comprises a neighbor information unit in a neighbor list or extended neighbor list.

4. An apparatus for handoff between Code Division Multiple Access (CDMA) base stations comprising:
   a configuration unit configured to configure a dedicated information unit bearing the PILOT_INC information in the handoff request ACK message; and
   a first bearing unit configured to bear the PILOT_INC information into the dedicated information unit;
   a first receiving unit configured to receive a handoff request message sent by a source base station; and
   an informing unit configured to inform the source base station of Pilot pseudo noise sequence offset index increment (PILOT_INC) information of a target base station; wherein the PILOT_INC of the source base station and the PILOT_INC of the target base station is different;
   a second receiving unit configured to receive the PILOT_INC information of the target base station and a pilot pseudo noise phase (PILOT_PN_PHASE) of the target base station reported by a user equipment requesting handoff between the base stations; and
   a calculating unit configured to calculate pilot pseudo noise (PILOT_PN) corresponding to the pilot pseudo noise phase using the PILOT_INC information of the target base station;
   wherein the calculating unit is further configured to calculate the pilot pseudo noise by using the following formula:

$$PILOT\_PN = \left\lfloor \frac{PILOT\_PN\_PHASE + 32 \times PILOT\_INC}{64 \times PILOT\_INC} \right\rfloor \times PILOT\_INC,$$

where PILOT_PN means the pilot pseudo noise, PILOT_PN_PHASE means the pilot pseudo noise phase, and "$\lfloor \ \rfloor$" means rounding down calculation.

5. The apparatus according to claim 4, further comprising:
   a second bearing unit configured to bear the PILOT_INC information into an existing information unit in the handoff request ack message.

6. The apparatus according to claim 5, wherein the existing information unit in the handoff request ack message comprises a neighbor information unit in a neighbor list or extended neighbor list.

* * * * *